2 Sheets—Sheet 1.
E. LANGEN.
Apparatus for Liquoring Lump Sugar.
No. 226,078  Patented Mar. 30, 1880.
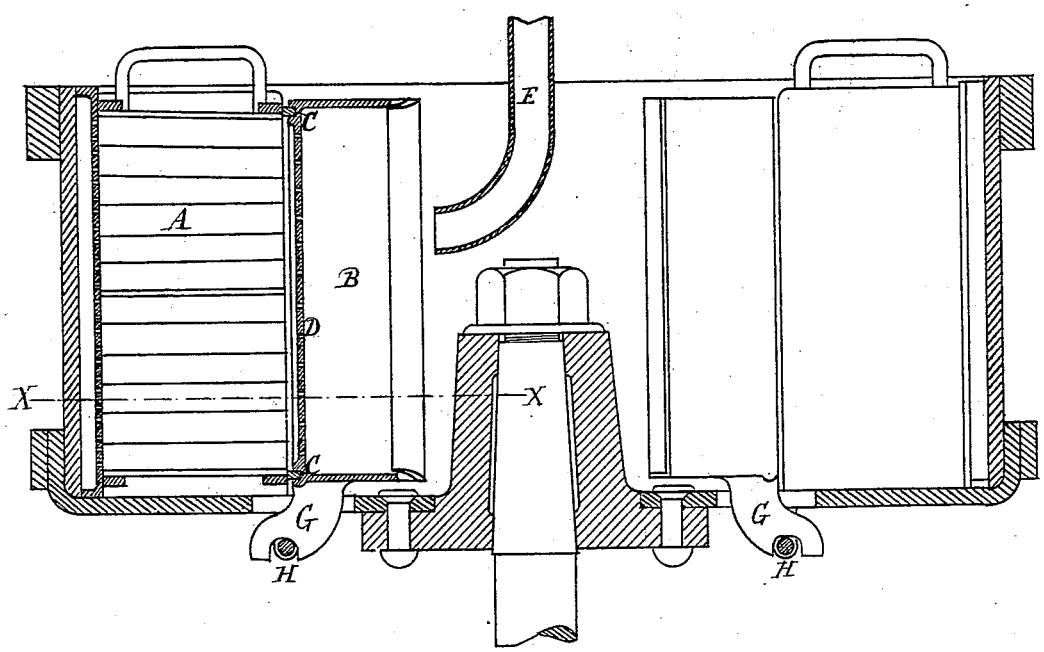
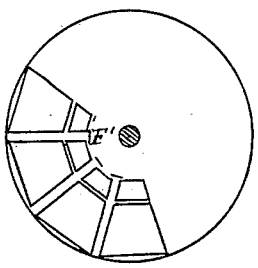
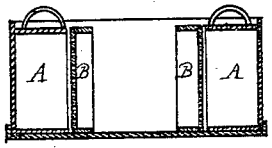
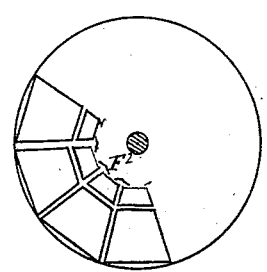
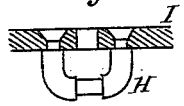
Attest:
J. Henry Kaiser
James M. Wright
Inventor:
Eugen Langen.
By James L. Norris
Atty.

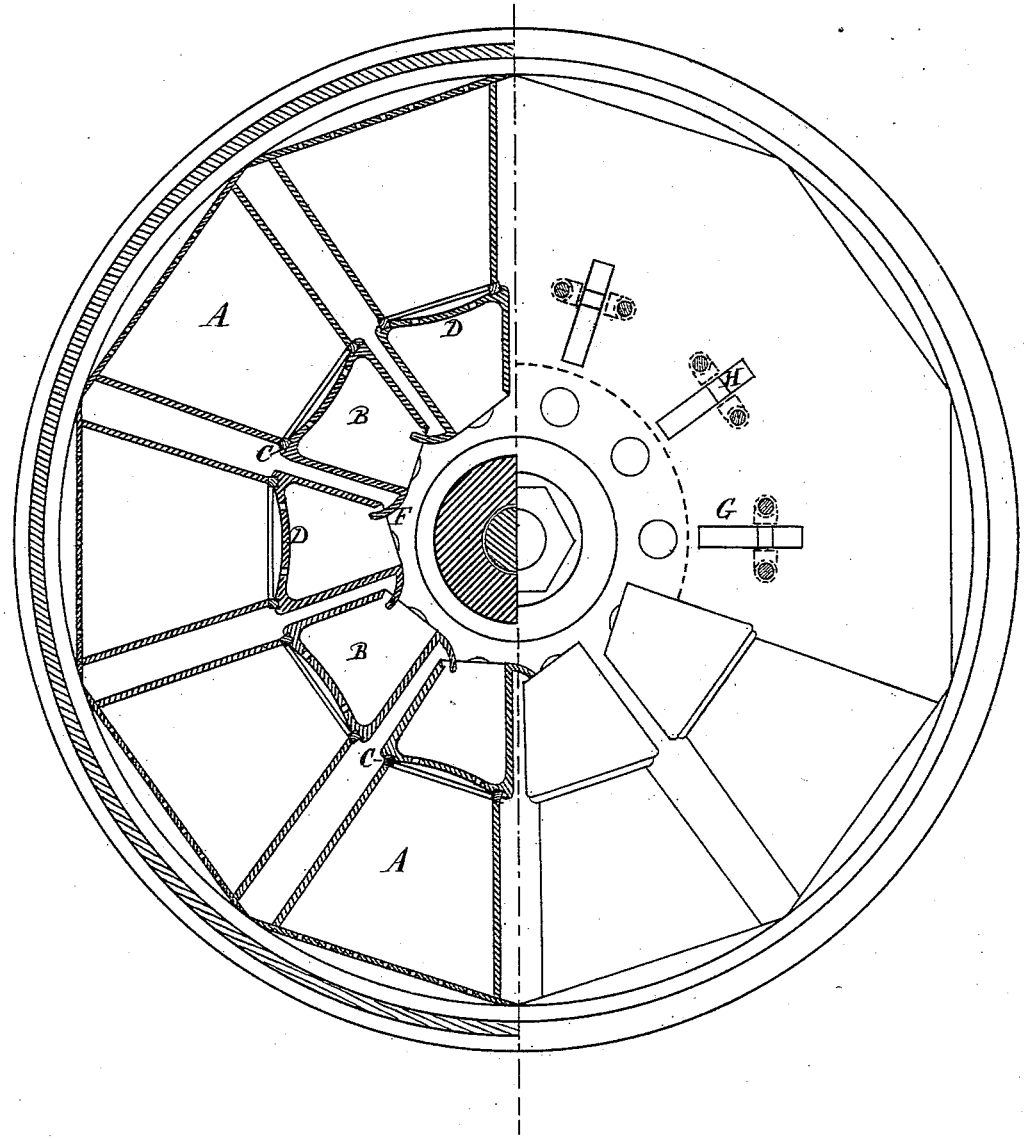

UNITED STATES PATENT OFFICE.

EUGEN LANGEN, OF COLOGNE, GERMANY.

APPARATUS FOR LIQUORING LUMP-SUGAR.

SPECIFICATION forming part of Letters Patent No. 226,078, dated March 30, 1880.

Application filed October 16, 1879. Patented in England August 30, 1879.

*To all whom it may concern:*

Be it known that I, EUGEN LANGEN, of Cologne, in the German Empire, have invented Improved Apparatus for Liquoring or Claying Lump-Sugar by Centrifugal Action; and I do hereby declare that the following description, taken in connection with the accompanying drawings, hereinafter referred to, forms a full and exact specification of the same, wherein I have set forth the nature and principles of my said improvement, by which my invention may be distinguished from others of a similar class, together with such parts as I claim and desire to secure by Letters Patent—that is to say, according to the invention for which I obtained Letters Patent of the United States bearing date, respectively, the 7th January, 1873, and the 2d June, 1874.

I prepared hard white lump-sugar by means of a centrifugal machine, the impregnating of the sugar with the claying or clarifying liquor being effected by a separate process in a special apparatus, to which the molds with the sugar slabs had to be removed from the centrifugal machine.

My present invention has for its object to do away with such separate process by subjecting the sugar to the action of the clarifying-liquor while in the centrifugal machine by means of arrangements and apparatus which I will now describe.

Within the centrifugal drum containing the segmental sugar-molds, such as described in my said prior patents, I provide loose receptacles, of a shape corresponding to that of the molds, against the inner open ends of which they rest with a fillet of caoutchouc or other material that, in being pressed against the molds, will form a water-tight joint between the two. These receptacles may either be quite loose in the centrifugal drum, so that when the latter is rotated the centrifugal force will cause them to slide up against the face of the molds, or by preference they are pivoted at bottom to the bottom of the drum in such a manner that when the drum is at rest the upper part will drop away from the mold, so as to allow the mold to be removed. The clarifying-liquor is led into these receptacles through a stationary curved central pipe, and in order to insure that the liquor shall not pass from the pipe into the interstices between the molds the receptacles are either provided with a lip on one side which overhangs the edge of the next receptacle or separate shields may be provided which cover the contiguous sides of two receptacles. The receptacles are open at the inner side presented to the said liquor-pipe, but on the side next the mold they are closed by a perforated plate, so that the liquor passing in from the pipe passes in an evenly-distributed manner through the perforations into the sugar-molds, from the perforated outer faces of which it is thrown out by the centrifugal action in the usual manner.

Without the above arrangement of the charging-receptacles with perforated faces the liquor passing in from the pipe in being thrown by the centrifugal force against the one side of the receptacle would flow thence almost entirely to one side only of the molds, and thus effect a very imperfect liquoring of the sugar.

Referring to the drawings, Figure 1 shows a vertical section of a centrifugal machine arranged for liquoring according to my invention. Fig. 2 shows a part plan and part-sectional plan on line X X, Fig. 1.

A A are the molds containing the sugar slabs. B B are the charging-receptacles, resting with caoutchouc fillets C against the inner faces of the molds, and having the closed perforated faces D, through which the clarifying-liquor entering through the pipe E passes into the molds.

The receptacles have each a lip, F, on their one side, which overhangs the contiguous side of the next one, so that the liquor flowing from the pipe E into them cannot get into the spaces between them; or, in place of such lip, separate shields may be provided, either formed of straight plates, as indicated at F' in the diagram Fig. 3, or of angular plates, as shown at F² in Fig. 4.

The receptacles rest with notched brackets G upon pins H, Fig. 6, carried by the bottom of the drum I, upon which pins they can turn as on hinges, falling away from the mold when the drum is at rest until their lower sides come in contact with the rivet-heads of the drum, while, when the drum rotates, the centrifugal force brings them close against the molds. Instead of being thus hinged the receptacles might be quite loose, as indicated in the diagram Fig. 5, and slide in contact with the molds when the drum rotates.

I am aware that in liquoring hard sugar centrifugal drums have been provided with a series of sugar-molds having openings toward the centers of the drums and means for supplying liquor to the sugar through these inward openings; but such I do not claim. Neither do I claim, broadly, a series of sugar-molds arranged in the basket of a centrifugal machine, combined with an inner series of liquoring-receptacles loosely contained in the basket and free to move radially against the sugar-molds by centrifugal force; and neither do I claim, broadly, the combination, with a centrifugal drum and sugar-molds, of liquor-receptacles provided with pivotal bearings at their front lower ends or edges and resting on such bearings, whereby they will swing inwardly by gravity and outwardly against the molds by centrifugal force.

Having thus described the nature of the said invention and in what manner the same is to be performed, I claim—

1. In a centrifugal liquoring or claying machine, the combination, with the removable sugar-molds, of the independent removable receptacles arranged in front of said molds, open at their inner sides, and provided with perforated back walls adjacent to the sugar-molds, as described, said receptacles being pressed against the said molds by centrifugal force, and supplying the clarifying-liquor to the same through the perforated back walls, substantially as described.

2. The combination, with the centrifugal drum and the sugar-molds arranged therein, of the receptacles arranged in front of said molds, open at their inner sides, and provided with perforated back walls, and a liquor-supply pipe extending centrally into the drum and bent toward the said receptacles, substantially as and for the purpose set forth.

3. The combination, with the centrifugal drum and the sugar-molds arranged therein, of the liquor-receptacles, open at their inner sides, and each provided at one edge of its open side with a laterally outward projecting lip, which laps over the front edge of the side wall of an adjacent receptacle, and a liquor-delivery spout terminating in front of the open sides of said receptacles, substantially as and for the purpose set forth.

In testimony whereof I have signed my name to this specification in the presence of two subscribing witnesses this 18th day of September, 1879.

EUGEN LANGEN.

Witnesses:
  FRIEDL. GUSTORFF,
  C. FRANZEN.